United States Patent [19]

Meixner

[11] 4,088,889
[45] May 9, 1978

[54] X-RAY FILM GUIDE

[75] Inventor: Gary Howard Meixner, Westland, Mich.

[73] Assignee: Detroit Osteopathic Hospital Corp., Oak Park, Mich. ; a part interest

[21] Appl. No.: 780,470

[22] Filed: Mar. 23, 1977

[51] Int. Cl.² .............................................. G11B 1/00
[52] U.S. Cl. .................................... 250/470; 250/468
[58] Field of Search .............................. 250/468, 470

[56] References Cited

U.S. PATENT DOCUMENTS

| | | | |
|---|---|---|---|
| 2,617,944 | 11/1952 | Sanchez-Perez | 250/470 |
| 2,795,702 | 6/1957 | Morris | 250/470 |
| 2,826,702 | 3/1958 | Campbell et al. | 250/468 |
| 3,015,028 | 12/1961 | Clark | 250/470 |
| 3,091,691 | 5/1963 | Snow | 250/470 |
| 3,188,466 | 6/1965 | Jimenez | 250/468 |

Primary Examiner—Alfred E. Smith
Assistant Examiner—T. N. Grigsby
Attorney, Agent, or Firm—Harness, Dickey & Pierce

[57] ABSTRACT

This disclosure relates to a film guide for use with a film loading box on an automatic sequential x-ray machine. Such automatic sequential x-ray machines are rapid changing film devices used for transporting and exposing x-ray film in rapid sequence for special medical procedures. The film guide of this invention is specially adapted to be secured in a film loading box in such a way so as to provide support for x-ray film which is half the size of that normally used in the film loading boxes of such automatic sequential x-ray machines. Since only half the amount of x-ray film and considerably less x-ray film developing solutions are used when the film guide of this invention is installed, rather dramatic and substantial cost savings are possible for hospitals and x-ray laboratories.

9 Claims, 4 Drawing Figures

X-RAY FILM GUIDE

BACKGROUND OF THIS INVENTION

I. Field of the Invention

The present invention pertains primarily to devices for use in x-ray or radiographic examination, and more particularly to devices for use with automatic sequential x-ray machines.

II. Description of the Prior Art

Generally, automatic sequential x-ray machines are rapid changing film devices used for transporting and exposing x-ray film in rapid sequence. Most hospitals and x-ray laboratories have such units available for special medical procedures such as renal arteriograms, lumbar aortograms, or cerebral angiograms, to name just a few. These procedures consist of roentgenographic visualization of blood vessels after the injection of a radiopaque substance and typically include a sequence of several x-ray visualizations starting just before the injection of such a radiopaque substance and continuing at rapid intervals until the radiopaque substance completely fills the area or dissipates. Although real arteriograms, lumbar aortograms, and cerebral angiograms are just three examples of such medical procedures, x-ray methods of this type are used in many other areas of the body and are especially adaptable to the examination of spenic, celiac, hepatic, for femoral blood vessels.

In order to expose x-rays at rapid intervals while the radiopaque substance is entering, arriving at, and/or leaving the selected area of examination, a machine capable of transporting and exposing x-ray film at such rapid intervals must be provided in order to capture such a sequence of events on radiographic film. Automatic sequential x-ray machines such as those manufactured by Elema Schonander, Picker Corp. and Sanchez Perez are able to provide such exposures, and basically, function by transporting a series of x-ray films from a film loading box, through the exposure area, and then to an exposed film storage box.

A film loading box such at that used on the automatic sequential x-ray machine manufactured by Elema Schonander consists of a metal box with wire film dividers contained therein. Such a box would be able to accommodate about 30 pieces of x-ray film each of which are normally 14 inches by 14 inches in size. When such a size of film is used, the relevant image on the x-ray film usually only takes up less than half of the available film area, thus creating a rather substantial waste of expensive x-ray film and necessary x-ray film developing solutions.

In view of the ever increasing costs in the medical field, efforts are being made in many directions to eliminate waste and conserve valuable supplies. Hospitals throughout the country are plagued with spiraling increases in personnel, equipment and other necessary items. It thus seems apparent that a medical procedure which uses twice as much x-ray film as necessary and also uses substantially more x-ray developing solutions than are necessary is inherently wasteful and grossly out of place in an atmosphere of cost containment and control. Several prior attempts to use smaller sizes of x-ray film failed since the unsupported x-ray films would get out of alignment and become obstructed.

It is a principal object of the present invention, therefore, to provide a device for use with a film loading box on an automatic sequential x-ray machine.

It is a further object of the present invention to provide a device which adapts a film loading box on an automatic sequential x-ray machine to the use of x-ray film up to half the size of that normally used.

It is another object of the present invention to provide a device which is capable of saving hospitals and x-ray laboratories rather substantial amounts of money.

Other objects, features and advantages of the present invention will become apparent from the subsequent description and the appended claims taken in conjunction with the accompanying drawings.

SUMMARY OF THE INVENTION

In accordance with the present invention, a film guide for use with a film loading box on an automatic sequential x-ray machine is provided which is specially adapted to be secured in a film loading box in such a way so as to provide support for x-ray film which is up to half the size of that normally used. Since up to half the amount of x-ray film and a considerable amount of x-ray film developing solutions are saved when the film guide of the present invention is used, rather substantial cost savings are possible for those involved in providing medical services which require the use of such automatic sequential x-ray machines.

BRIEF DESCRIPTION OF THE DRAWINGS

The foregoing objects and others will in part be apparent and in part pointed out more fully hereinater in conjunction with the description of the preferred embodiment of the present invention illustrated in the accompanying drawings and in which.

DESCRIPTION OF THE PREFERRED EMBODIMENT

Figure 1:
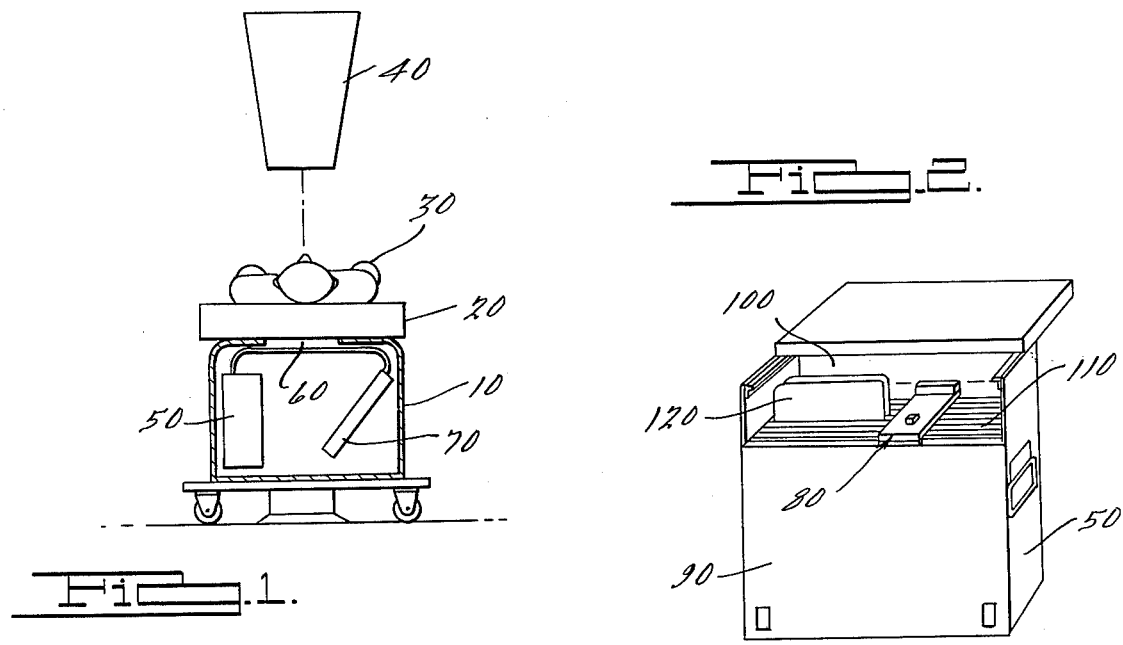
FIG. 1 is an end view of an automatic sequential x-ray machine in use in a hospital x-ray laboratory.

Referring now to the drawings, wherein the showings are for the purpose of illustrating a preferred embodiment of the invention only and are not for the purpose of limiting the invention, FIG. 1 shows an automatic sequential x-ray machine 10 in use in a hospital x-ray laboratory. Said automatic sequential x-ray machine 10 is typically portable and is normally wheeled under the x-ray examination table 20 where the patient 30 lies. When said patient 30 is injected with a radiopaque substance the x-ray emitter 40 functions simultaneously and in sequence with the automatic sequential x-ray machine 10. X-ray film in film loading box 50 is transported in rapid sequence to the exposure area 60 wherein the operation of x-ray emitter 40 causes an exposure to be made. Said x-ray film is then transported to the exposed film storage box 70.

Figure 2:
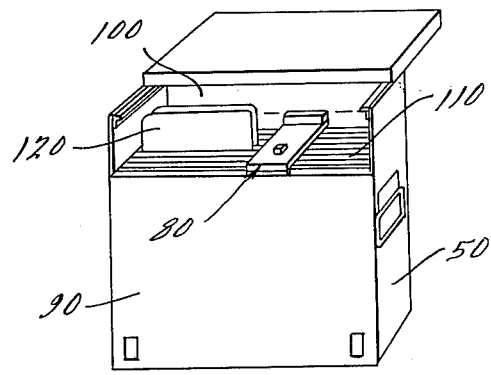
FIG. 2 is a perspective view of the film guide of the present invention in position in a film loading box.

FIG. 2 shows the film guide 80 of the present invention installed in position in film loading box 50. The film guide 80 is positioned across the width of said film loading box 50 from the front side 90 to the back side 100, an rests on top of a plurality of film dividers 110. Said film dividers 110 and wire separators contained within the front side 90, the back side 100, the bottom and the two opposite parallel sides of film loading box 50, which serve to separate, support and align pieces of x-ray film 120 placed within the film loading box 50. Said film dividers 110 are not attached to any of the sides of said film loading box 50 but are positioned when x-ray film 120 is placed in between said plurality of film dividers 110.

Figure 3:
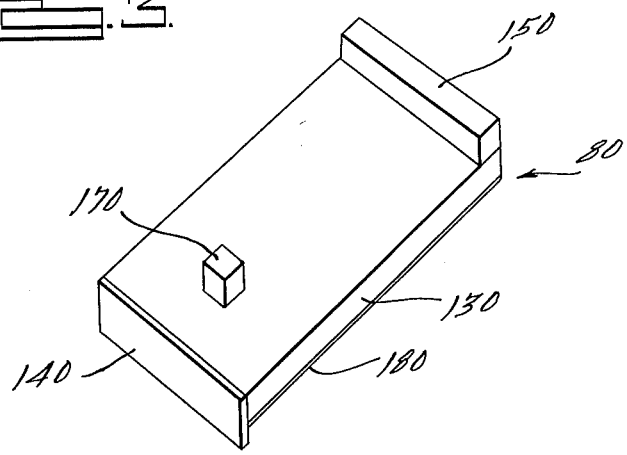
FIG. 3 in a perspective view of a preferred embodiment of the film guide of the present invention.

FIG. 3 shows a perspective view of a preferred embodiment of the film guide 80 of the present invention in which the base portion 130, which extends substantially across the width of said film loading box 50, has a positioning member 140 attached to one end of said base portion 130. Said positioning member 140 extends below said base portion 130 and functions to align and separate one of said film dividers 110 from the adjacent side. Without such separation and alignment of the film dividers, the use of smaller size film would be virtually impossible. In a preferred embodiment of the present invention, said positioning member 140 is attached to the front end of said base portion 130, and when installed, is adjacent to the front side 90 of said film loading box 50.

A step-up portion 150 may also be added above the back end of said base portion 130. Said step-up portion 150 is adapted to position said film guide 80 on the back side 100 of said film loading box 50. Typically, the size of said step-up portion 150 is dictated by the spacing of a mating groove or track on the back side 100 of said film loading box 50.

Figure 4:
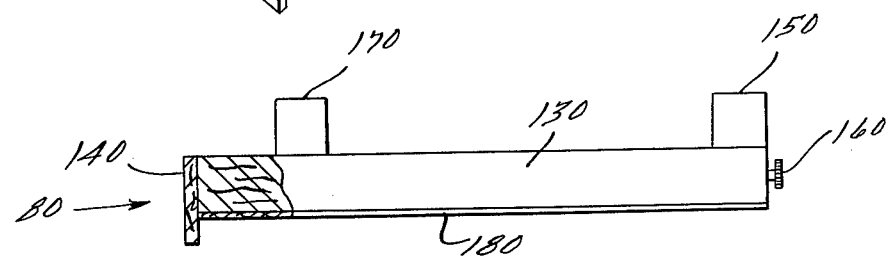
FIG. 4 is a side end view of a preferred embodiment of the film guide of the present invention.

As shown in FIG. 4, fastening means 160 may be provided on the back side of said base portion 130, which is adapted to secure said film guide 80 to the back side 100 of said film loading box 50. Examples of possible fastening means include a slide bolt lock or a thumb screw.

In order to facilitate moving and positioning of said film guide 80 within said film loading box 50, a knob 170 may be provided. In addition, in order to protect the bottom side of said base portion 130 and said film dividers 110 from abrasions as well as to aid in securely clamping said film dividers 110 in equal spacing across the width of said film loading box 50, said base portion 130 may be covered with a soft fabric 180 such as felt on its bottom side.

The film guide of the present invention as described in the preferred embodiment above is specially adapted for use on an Elema Schonander automatic sequential x-ray machine. It has been found that a base portion which is about 5⅜ inches long, about 2¾ inches wide, and about ½ inch high, to which is attached a positioning member which adds about ⅛ inch to the length of said base portion and extends about ⅜ inch below said base portion, performs well when installed in the film loading box of such machines. A step-up portion about ½ inch high has been found to mate with the groove or track on the back side of said film loading box. Felt of a thickness of about 1/16 inch has been found adequate.

The film guide may be easily manufactured from such materials as wood or the like, thus making the device of the present invention simple to manufacture and relatively inexpensive in selling price.

It has been found that by using two new sizes of film, 7 × 14 inch and 10 × 14 inch, which are supported by the film guide of the present invention, instead of the normal 14 × 14 inch film size, substantial cost savings can be made in film and film developing solutions. The following cost savings figures are based on a typical hospital x-ray laboratory and are scaled up to estimate the cost savings to the approximately 8000 users of Elema Schonander automatic sequential x-ray machines.

TABLE I

| Type of Examination | Number per year in typical hospital |
| --- | --- |
| Unilateral Cerebral Angiogram | 32 |
| Bilateral Cerebral Angiogram | 57 |
| Lumbar Aortograms | |
| 1) Unilateral Renal | 20 |
| 2) Bilateral Renal | 165 |
| Other Selected Vessels (Hepatic, Spenic, Celiac) | 115 |

The current cost of x-ray film is estimated to be about 0.36735 cents per square inch. The current cost of film developing solutions is estimated to be about 0.003255 cents per square inch of film. Thus:

TABLE II

| Size of Film | Film Cost | Developing Cost |
| --- | --- | --- |
| 14 × 14 | 72.0006 cents | 0.63798 cents |
| 10 × 14 | 51.429 cents | 0.4557 cents |
| 7 × 14 | 36.0003 cents | 0.3185 cents |

Therefore, the resultant cost savings by using smaller film is as follows:

TABLE III

| Size used in place of 14 × 14 | Film Savings | Developing Savings |
| --- | --- | --- |
| 10 × 14 | 20.5716 cents | 0.18228 cents |
| 7 × 14 | 36.0003 cents | 0.31899 cents |

TABLE IV

| Type of Examination | Number of Films Used | New Film Size | Film Savings | Developing Savings | Total Savings |
| --- | --- | --- | --- | --- | --- |
| Unilateral Cerebral Angiogram | 10 | 10 × 14 | $2.06 | 18 cents | $2.24 |
| Bilateral Cerebral Angiogram | 20 | 10 × 14 | $4.11 | 36 cents | $4.47 |
| Lumbar Aortograms | | | | | |
| 1) Unilateral Renal | 10 | 7 × 14 | $3.60 | 32 cents | $3.92 |
| 2) Bilateral Renal | 20 | 7 × 14 | $7.20 | 64 cents | $7.84 |
| Other Selected Vessels (Hepatic, Spenic, Celiac) | 12 | 10 × 14 | $2.47 | 22 cents | $2.69 |

Therefore, summing up cost savings per exam and multiplying by the approximately 8000 Elema Schnoander automatic sequential x-ray machines, the following cost savings are possible:

TABLE V

| Type of Examination | Total Cost Savings (from Table IV) | Number of Examinations (from Table I) | × 8000 users |
| --- | --- | --- | --- |
| Unilateral | | | |

TABLE V-continued

| Type of Examination | Total Cost Savings (from Table IV) | Number of Examinations (from Table I) | × 8000 users |
| --- | --- | --- | --- |
| Cerebral Angiogram Bilateral | $2.24 | 32 | $573,440 |
| Cerebral Angiogram | $4.47 | 57 | $2,038,320 |
| Lumbar Aortograms | | | |
| 1) Unilateral Renal | $3.92 | 20 | $627,200 |
| 2) Bilateral Renal | $7.84 | 165 | $10,348,800 |
| Other Selected Vessels | $2.69 | 115 | $2,474,800 |
| (Hepatic, Spenic, Celiac) | | | |
| | | TOTAL | $16,062,560.00 |

Thus, if all users of Elema Schonander automatic sequential x-ray machines installed the film guide of the present invention in their film loading boxes and used the smaller film sizes, the above total cost savings would result in one year.

It should be noted that the film guide of the present invention is very easy to install in a film loading box and can be removed within a few seconds. When positioned 7 or 10 inches from a side of the film loading box, and secured to the back side of said film loading box, the film guide furnishes excellent support for the smaller film sizes in the box. By separating and aligning the first film divider from the front side of the film loading box and then clamping down on the remainder of the film dividers, all the film dividers and interspaced pieces of x-ray film are supported for unobstructed operation of the automatic sequential x-ray machine.

While it will be apparent that the preferred embodiment of the invention is well calculated to fulfill the objects above stated, it will be appreciated that the invention is susceptible to modification, variation and change without departing from the proper scope or fair meaning of the subjoined claims.

What is claimed is:

1. An x-ray apparatus for taking x-rays, including a film guide for use with a film loading box on an automatic sequential x-ray machine, said film loading box being comprised of a plurality of film dividers contained within a front side, a back side, a bottom, and two opposite parallel sides of said film loading box, said film guide comprising:
    a base portion which extends substantially across the width of said film loading box from said front said to said back side, and rests on top of said plurality of film dividers, and
    a positioning member attached to one end of said base portion which extends below said base portion and aligns and separates one of said film dividers from the adjacent side.

2. The invention of claim 1 wherein said positioning member is attached to the front end of said base portion.

3. The invention of claim 1 which further comprises a step-up portion located above the back end of said base portion, adapted to position said film guide on the back side of said film loading box.

4. The invention of claim 1 which further comprises a fastening means located on the back end of said base portion, adapted to secure said film guide to the back side of said film loading box.

5. The invention of claim 1 which further comprises a knob located on top of the base portion, adapted to facilitate positioning of said film guide.

6. The invention of claim 1 wherein said base portion is covered with a soft fabric on its bottom side.

7. The invention of claim 6 wherein said soft fabric is felt.

8. An x-ray apparatus for taking x-rays, including a film guide for use with a film loading box on an automatic sequential x-ray machine, said film loading box being comprised of a plurality of film dividers contained within a front side, a back side, a bottom, and two opposite parallel sides of said film loading box, said film guide comprising:
    a base portion which extends substantially across the width of said film loading box from said front side to said back side, and rests on top of said plurality of film dividers, said base portion being covered with a soft fabric on its bottom side,
    a positioning member attached to the front end of said base portion which extends below said base portion and aligns and separates one of said film dividers from the front side of said film loading box,
    a step-up portion located above the back end of said base portion, adapted to position said film guide on the back side of said film loading box,
    a fastening means located on the back end of said base portion, adapted to secure said film guide to the back side of said film loading box, and
    a knob located on top of the base portion, adapted to facilitate positioning of said film guide.

9. The invention of claim 8 wherein said soft fabric which covers the bottom side of said base portion is felt.

* * * * *